United States Patent Office 3,197,314
Patented July 27, 1965

3,197,314
NOVEL ANTIFOULING COMPOSITIONS
Frank J. Gross, Somerset, N.J., assignor to American Cyanamid Company, Stamford, Conn., a corporation of Maine
No Drawing. Filed July 12, 1962, Ser. No. 209,312
8 Claims. (Cl. 106—15)

This invention relates to improved marine antifouling compositions and to an improved method for retarding the fouling by organisms of surfaces exposed to sea water. More particularly, the present invention relates to marine antifouling compositions comprising in effective amounts a new class of organo-metallic anti-fouling agents and to the use of such compositions for retarding the fouling organisms of surfaces exposed to sea water.

Various types of materials, particularly heavy metal toxicants and especially copper based compounds, have been used in the past as antifouling agents. These are especially useful for preventing growth and adherence to the surface of organisms encountered when the surface is exposed to sea water, especially the hull of boats. These are often conveniently applied to the surface in a paint or coating composition. Even though various materials have been used for this purpose in the past, there is still a definite need for a suitable organic material effective as an antifouling agent, since there are a number of reasons why the presently used materials are deficient in action or otherwise objectionable. Thus, an organic material would fill the need in a number of aspects, for example as follows:

(1) An organic antifoulant would be superior in that it would have less tendency to corrode the materials in boat construction; this would avoid the necessity for the application of protective coats before the copper based antifouling coating is applied to the metal hull.

(2) Copper based materials generally are colored and this puts a definite limitation on the range of color of paint or coating composition. A colorless organic material would allow a range of white or pastel shades of finishes.

(3) The use of an organic antifouling agent for incorporation into fiberglass reinforced plastic material in boat construction is desirable since this would make unnecessary the application of an antifouling paint of undesirable color. Adhesion of conventional antifouling paints to plastic is poor and incorporation of a suitable organic antifouling agent into plastic paint would overcome the necessity for use of a separate antifouling coating.

(4) An organic antifoulant would have use for incorporation in the elastomer coating on fabric structures used increasingly for marine transport of material, undersea storage, military applications, etc.

(5) There is a definite need for an effective antifouling agent non-toxic to humans, otherwise for use in water system installations using sea water. An example of a material now used in such application is pentachlorophenol but here there is also room for considerable improvement.

Thus, in evaluating material for the described uses and to obtain the desired benefits of an organic antifouling agent, a number of aspects are to be considered such as color of the material, toxicity to marine plants and animals accompanied by relative non-toxicity to humans, proper physical state such as fine state of division for use in paints and ready availability from commercially available intermediates and the like.

It is thus the principal object of the present invention to provide an organic antifouling agent and compositions containing the same, which antifouling agent ranks high in the particular points mentioned hereinabove in describing suitable antifouling agents.

It is a further object of the present invention to render surfaces normally exposed to sea water resistant to fouling by organisms by the application to or incorporation into such surfaces of the novel antifouling compositions of this invention.

These and other objects and advantages of the present invention will become more apparent from the detailed description thereof set forth hereinbelow.

In accordance with the present invention, novel antifouling compositions are provided which comprise an effective amount of an organo-bismuth compound selected from the group consisting of those having the following formulae:

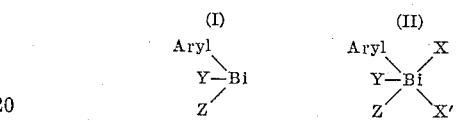

where Y and Z are selected from the group consisting of halogen, aryl or aryl=A; wherein the aryl groups are aryl radicals (including substituted aryl); A is a heteroatom selected from the group consisting of S and O; and X and X′ are selected from the group consisting of monovalent atoms, monovalent radicals, and when X and X′ are taken together, divalent atoms and divalent radicals.

The organo-bismuth compounds contemplated for use in the present invention are those compounds meeting the classical definition of organo-metallic compounds, that is, those having at least one carbon metal bond. Thus, such compounds contemplated for use in the present invention excluded salts of organic acids, i.e., most ionic bondings including metal alkoxides and the like, and compounds where the bonding to carbon is only through heteroatoms such as O or S. Coordination or chelate compounds are also excluded.

Preferably, the organo-bismuth compound is one represented by the formula:

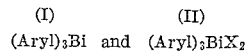

(Aryl)₃Bi and (Aryl)₃BiX₂ where aryl represents an aryl radical, particularly phenyl, which may contain various substituents, and where X represents halogen such as chlorine, bromine or fluorine.

The following are typical of such compounds contemplated for use in the present invention.

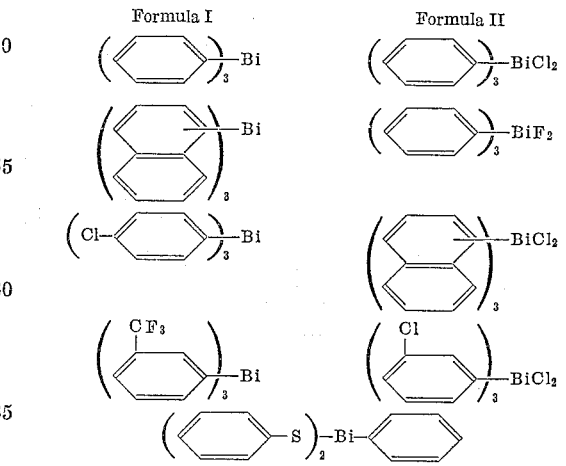

Of the organo-bismuth compounds represented by the preferred sub-generic grouping set forth hereinabove, triphenylbismuthine, triphenylbismuth dichloride and triphenylbismuth difluoride are of particular interest and particularly preferred.

These organo-bismuth compounds may be employed singly or in combination with one another and in effective amounts in suitable compositions, which compositions may be considered herein, at least in a general sense, as being a carrier for said organo-bismuth compounds. Such carriers include paints, colorless finishes, lacquers such as nitrocellulose lacquers, various types of resin coating systems such as those containing acrylic resins, unpigmented vinyl resins and such carrier or coating vehicles as are generally well known to those skilled in the art of providing antifouling coating to surfaces exposed to sea water.

As indicated, they are employed in effective amounts, i.e., amounts which reduce or halt the growth of marine organisms, and thus depending upon the use may constitute from between 2 and 25% of such vehicles, though usually amounts of from between 2.5 and 10% based on the total weight of formulation are suitable. About 7 to 10% is a practical range for effective protection.

In order that the present invention may be more fully understood, the following examples are given primarily by way of illustration. No specific details or enumerations contained therein should be construed as limitations on the present invention except insofar as they appear in the appended claims. All parts and percentages are by weight unless otherwise specifically designated.

EXAMPLE 1

The method of testing used is one for determination of the effect of the material on fouling organisms under conditions essentially the same as those to be encountered in actual service. The material to be tested is dissolved in a suitable solvent and a porous inert ceramic block is impregnated with this solution. The solvent is then evaporated in such a manner as to permit the chemical to be deposited within the pores of the panel so that it is available for leaching if immersed in sea water. Blocks thus impregnated are exposed to fouling in sea water in the ocean (off Miami Beach, Florida) and inspected minutely at ten day intervals for from 6 to 8 weeks. The fouling organisms present in the environment are assessed by observation of blocks containing non-toxic material. The effectiveness of the test compounds is estimated by comparison with the non-toxic controls and with panels impregnated with materials which have previously shown to be effective at least in some degree.

In the following table are shown results of a preliminary test program showing the effectiveness of the compounds against various types of fouling organisms. The evaluation is given in comparative figures with a rating of 10 designating maximum effectiveness and a rating of 0 indicating complete ineffectiveness. These tests were conducted on the specified fouling organisms using the test compounds in 10% solutions in dimethylformamide.

The results of this test are set forth in Table A below.

Table A

| Fouling Organism | Compound I | Compound II |
| --- | --- | --- |
| Algae | 9 | 10 |
| Amphipods | 10 | 10 |
| Annelids | 10 | 10 |
| Barnacles | 10 | 10 |
| Bryozoans | 10 | 10 |
| Hydroids | 10 | 10 |
| Molluscs | 10 | 10 |
| Tunicates | 10 | 10 |
| Micro-fouling (Fungi, bacterial slime) | 9 | 10 |

(I) Triphenylbismuthine.
(II) Triphenylbismuth dichloride.

EXAMPLE 2

Two illustrative antifouling coating compositions containing triphenylbismuth dichloride were prepared having the following composition:

I

| | Parts |
| --- | --- |
| Triphenylbismuth dichloride | 50 |
| Fibrous talc (pigment) | 403 |
| A non-reactive phenolic resin | 100 |
| Rosin-abietic acid paper size | 315 |
| A resinous plasticizer (hydrogenated methyl ester of rosin) | 45 |
| Mineral spirits | 246 |

II

| | |
| --- | --- |
| Triphenylbismuth dichloride | 200 |
| Fibrous talc (pigment) | 179 |
| A non-reactive phenolic resin | 100 |
| Rosin-abietic acid paper size | 315 |
| A resinous plasticizer (hydrogenated methyl ester of rosin) | 135 |
| Mineral spirits | 177 |

Each of the above formulations, when subjected to testing as antifouling coating compositions, demonstrated significant resistance to fouling.

EXAMPLE 3

Triphenylbismuth dichloride is incorporated in paint made up with a polyvinyl alcohol latex emulsion and this is applied in two or three coats to a panel which is then exposed to sea water for one month at Miami Beach, Fla. The panels are then examined for fouling and condition of surface, noting the extent to which marine organisms grow on the surface.

The test demonstrated 100% ratings or complete protection (complete absence of marine growth) after exposure for one month using surface coating compositions containing about 66 parts of agent for each approximate 1000 parts of coating composition.

Amounts as low as 25 parts of triphenylbismuth dichloride for each approximately 1000 parts of coating composition were effective to some degree in the test carried out.

A typical formulation employed in Example 3 is as follows:

| | Parts |
| --- | --- |
| Hydroxyethylcellulose latex paint thickener | 166 |
| Nonionic dispersants | 5 |
| Lecithin | 2 |
| Titanium dioxide | 100 |
| Carbitol | 15 |
| Antifouling agent | 66 |
| Talc | 62 |
| Water | 260 |
| Polyvinylalcohol latex emulsion (55–57% solids) | 334 |
| | 1010 |

A plywood panel to which two coats of the above paint composition were applied showed a finish in good condition with no growth of marine organisms after an exposure of one month's duration to sea water at Miami Beach, Florida.

Similar results were obtained when the amounts of talc, water and latex emulsion in the composition were varied; also increasing the amount of antifouling agent did not hinder the effect as shown by a formulation containing 211 parts of agent per 1000 parts of formulation.

Panels painted with a coating composition with no antifouling agent (similar to the above except that the antifouling agent was omitted and substituted by additional talc) under identical test exposure conditions to sea water for one month became completely covered (complete fouling) with marine organisms.

It will be apparent from the above description that various other antifouling components and ingredients normally employed in antifouling coating composition formulations may be employed with the novel antifouling

I claim:
1. A marine antifouling composition comprising an effective amount of a compound selected from the group consisting of those having the following formulae:

(I) (Aryl)₃Bi    (II) (Aryl)₃BiX₂ where aryl represents a monocarbocyclic aromatic radical and X represents halogen.

2. A marine antifouling composition comprising a carrier and an effective amount of a compound selected from the group consisting of those having the following formulae:

(I) (Aryl)₃Bi    (II) (Aryl)₃BiX₂ where aryl represents a monocarbocyclic aromatic radical and X represents halogen.

3. A composition according to claim 2 in which the compound is selected from the group consisting of triphenylbismuthine, triphenylbismuth dichloride, and triphenylbismuth difluoride.

4. A method of protecting surfaces against marine fouling which comprises applying thereto a coating composition containing as an antifouling agent an effective amount of a compound selected from the group consisting of those having the following formulae:

(I) (Aryl)₃Bi    (II) (Aryl)₃BiX₂ where aryl represents a monocarbocyclic aromatic radical and X represents halogen.

5. A method of protecting surfaces against marine fouling which comprises applying thereto a coating composition containing as an antifouling agent an effective amount of a compound selected from the group consisting of triphenylbismuthine, triphenylbismuth dichloride and triphenylbismuth difluoride.

6. A process according to claim 5 in which the compound is triphenylbismuthine.

7. A process according to claim 5 in which the compound is triphenylbismuth dichloride.

8. A process according to claim 5 in which the compound is triphenylbismuth difluoride.

References Cited by the Examiner

UNITED STATES PATENTS 2,521,720  9/50  Hill.
2,685,523  8/54  Cross et al.
2,927,052  3/60  Moudry.

ALEXANDER H. BRODMERKEL, *Primary Examiner.*
MORRIS LIEBMAN, *Examiner.*